US009294509B2

(12) United States Patent
Ilyadis et al.

(10) Patent No.: US 9,294,509 B2
(45) Date of Patent: Mar. 22, 2016

(54) HIERARCHICAL MANAGEMENT OF DEVICES

(71) Applicant: BROADCOM CORPORATION, Irvine, CA (US)

(72) Inventors: Nicholas Ilyadis, Merrimack, NH (US); John Stuart Walley, Ladera Ranch, CA (US); Stephen Wilson Bailey, Hong Kong (HK); Wael William Diab, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 3 days.

(21) Appl. No.: 14/161,627

(22) Filed: Jan. 22, 2014

(65) Prior Publication Data
US 2015/0135260 A1    May 14, 2015

Related U.S. Application Data

(60) Provisional application No. 61/923,147, filed on Jan. 2, 2014, provisional application No. 61/904,432, filed on Nov. 14, 2013.

(51) Int. Cl.
    *H04L 29/06* (2006.01)
    *H04L 12/24* (2006.01)

(52) U.S. Cl.
    CPC ............... *H04L 63/20* (2013.01); *H04L 41/08* (2013.01)

(58) Field of Classification Search
    CPC .................................. H04L 63/20; H04L 63/10
    See application file for complete search history.

(56) References Cited

U.S. PATENT DOCUMENTS 7,409,432 B1 *  8/2008  Recio et al. ............... 709/209

OTHER PUBLICATIONS

"Machine to Machine", retrieved from <http://en.wikipedia.org/w/index.php?title=Machine_to_machine&oldid=578252152>, Oct. 22, 2013, 6 pgs.
"Internet of Things", retrieved from <http://en.wikipedia.org/w/index.php?title=Internet_of_Things&oldid=579804668>, Nov. 1, 2013, 10 pgs.
Diab, "A Telecommunication View of IoT with M2M and 802 Technology Perspectives", Apr. 11, 2013, 36 pgs., Version 1.0, IEEE-SA Shenzhen IoT Workshop, Shenzhen, China.

* cited by examiner

*Primary Examiner* — Izunna Okeke
(74) *Attorney, Agent, or Firm* — McDermott Will & Emery LLP

(57) ABSTRACT

A system for hierarchical management of devices may include memory and a processor. The processor may configure first devices of a first network with device operating policies to perform operations based at least on attributes of the first devices, where the operating policies prevent device interference. The processor may discover a second network of second devices managed by a second management entity and may negotiate with the second management entity to determine a primary management entity for the networks. The processor may receive device operating policies and attributes of the second devices when the second management entity is not the primary management entity. The processor may provide an adjusted device operating policy for a second device to the second management entity when the second device causes interference with a first device, the adjusted second device operating policy being based at least on attributes of the second device.

20 Claims, 7 Drawing Sheets

HIERARCHICAL MANAGEMENT OF DEVICES

CROSS-REFERENCE TO RELATED APPLICATIONS

The present application claims the benefit of U.S. Provisional Patent Application Ser. No. 61/923,147, entitled "Hierarchical Management of Devices," filed on Jan. 2, 2014, and U.S. Provisional Patent Application Ser. No. 61/904,432, entitled "Interoperable Devices," filed on Nov. 14, 2013, both of which are hereby incorporated by reference in their entireties for all purposes.

TECHNICAL FIELD

The present description relates generally to management of devices, and more particularly, but not exclusively, to hierarchical management of devices of one or more networks.

BACKGROUND

According to some estimates, more than 30 billion devices will be capable of being connected by 2020. These devices may include sensor devices, wearable devices, computing devices, and the like. Many of these devices may operate, either permanently or transiently, within a network that includes other such devices. The devices may be interoperably configurable to collectively perform one or more tasks, e.g. on behalf of a user and/or an application, and therefore may be referred to as interoperable devices. Thus, networks may include a large number of interoperable devices, and there may be a significant complexity associated with managing such devices, e.g. in conjunction with performing a task requested by an application and/or a user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
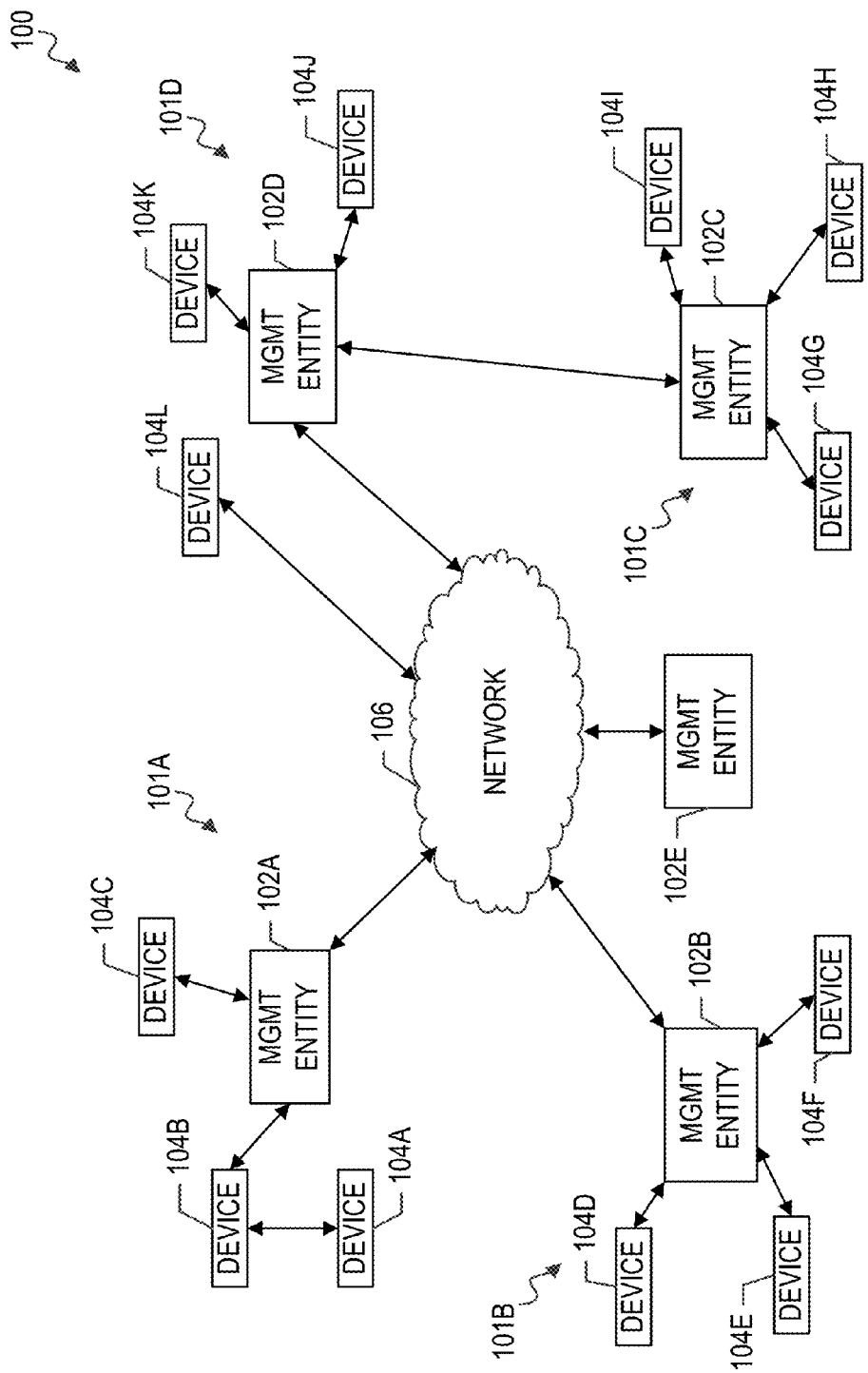
FIG. 1 illustrates an example network environment in which a system for hierarchical management of devices can be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more instances, structures and components are shown in block diagram form in order to avoid obscuring the concepts of the subject technology.

In the subject system, one or more devices, e.g. management entities, may be configured to manage one or more networks of devices, e.g. in conjunction with services performed by the devices. The one or more management entities may manage available resources of the devices that can be allocated to perform various services, e.g. as requested by an application and/or user. The resources may include processing resources, e.g. devices that include CPUs, sensing resources, e.g. sensors, and memory resources, e.g. devices that include memory, such as random access memory (RAM). The one or more management entities may further manage radio resources used by the interoperable devices in the network. The management of the radio resources may include managing the frequencies and/or transmission time slots used by the devices, e.g. to avoid interference, managing the transmission power used by the devices, e.g. to minimize power consumption, etc. The one or more management entities may transmit device operating policies to the devices that indicate the manner in which the devices should operate to perform one or more requested services, e.g. the data that should be transmitted, the frequency that should be used for transmission, etc.

When there are multiple management entities, e.g. for multiple networks of devices, the management entities may negotiate with one another to determine one of the management entities that will operate as the primary management entity for the networks. For example, the management entities may negotiate to determine which of the management entities has the shortest average path to the devices and/or to the other management entities. The remaining management entities may operate as secondary management entities. The primary management entity may determine and/or adjust device operating policies for one or more of the devices across the multiple networks, and may transmit the device operating policies to the secondary management entities corresponding to the devices and/or directly to one or more of the devices. The secondary management entities may then provide the device operating policies to the devices and/or may configure the devices using the device operating policies. In this manner, the primary management entity has access to the device operating policies of the devices across the multiple networks and therefore can adjust one or more device operating policies from a universal network perspective, as necessary, e.g. to minimize interference across the networks and/or to ensure that the devices are transmitting over the shortest and/or highest quality transmission paths.

FIG. 1 illustrates an example network environment 100 in which a system for hierarchical management of devices can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components can be provided.

The example network environment 100 includes devices 104A-L and management entities 102A-D that collectively form, and/or are a part of, one or more of the networks 101A-D. The network 106 may further include a management entity 102E. The example network environment 100 also includes a network 106. The network 106 and/or one or more of the networks 101A-D may include, and/or may be communicatively coupled to, one or more of the Internet, a private network, an internet of things network, or other networks. The network 106 and/or one or more of the networks 101A-D may include one or more wired or wireless network devices that facilitate device communication, such as switch devices, router devices, relay devices, etc., and/or may include one or more servers. In one or more implementations, the network 106 and/or one or more of the networks 101A-D, may be, and/or may include, a cloud of computers. In one or more implementations, the network 106, and/or one or more of the networks 101A-D, may be referred to as an internet of things (IOT) network and/or a machine-to-machine (M2M) network. In one or more implementations, one or more of the devices 104A-L may be referred to as an IOT device and/or an M2M device.

In one or more implementations, one or more of the devices 104A-L may include, or may be, a sensor device that may be configured to measure a physical quantity and convert the physical quantity into a signal. In one or more implementations, the devices 104A-L may include temperature sensors, video cameras, audio recorders, motion sensors, humidity sensors, smoke detectors, various gas sensors, radiation monitors, security sensors, such as door and/or window sensors, biometric sensors, wearable devices/sensors, implantable devices/sensors, embedded devices/sensors and/or any other devices/sensors. In some aspects, a sensor device may be a smart sensor that includes processing logic such as one or more controllers or processors, memory, and communication interfaces. In one or more implementations, one or more of the devices 104A-L may include, may be embedded in, and/or may be communicatively coupled to a portable device such as a portable communication device including a mobile phone, a laptop, a tablet, or any other communication device. In one or more implementations, one or more of the devices 104A-L may be action devices, such as actuators, alarm devices, automated devices, or any other devices that are capable of performing one or more actions. In one or more implementations, one or more of the devices 104A-L may be a mobile phone, a tablet device, a laptop computer, or any device with processing and/or memory resources.

In one or more implementations, one or more of the devices 104A-L, such as the device 104A, may be any device that is capable of communicating with one or more of the other devices 104B-L, the management entities 102A-E, and/or the network 106. In one or more implementations, one or more of the devices 104A-L may be communicatively coupled to one or more of the management entities 102A-E and/or the network 106 through one or more of the other devices 104A-L. In FIG. 1, the device 104A, such as a smart watch, may be communicatively coupled to the device 104B, such as a mobile phone, via a first network connection, such as a Bluetooth connection, and the device 104B may be communicatively coupled to the management entity 102A via a second network connection, such as a WiFi network connection. Thus, the device 104A may be communicatively coupled to the management entity 102A via a combination of the first network connection between the device 104A and the device 104B and the second network connection between the device 104B and the management entity 102A. In one or more implementations, the network connection between the device 104A and the management entity 102A, may be referred to as a transient network connection and/or a dependent network connection, since the network connection depends on the device 104B being proximally located to the device 104A, e.g. within Bluetooth range of the device 104B.

In one or more implementations, one or more of the devices 104A-L may be communicatively coupled to the network 106 through one or more of the management entities 102A-E, and/or one or more of the devices 104A-L may be communicatively coupled to one or more of the management entities 102A-E through the network 106. In FIG. 1, the device 104L may be associated with the network 101D and/or part of the network 101D on a transient basis, but located externally to network 101D, and therefore may be communicatively coupled to the management entity 102D via the network 106.

One or more of the management entities 102A-E may include and/or may be one or more wired or wireless network devices that facilitate device communication, such as router devices, switch devices, relay devices, etc. In one or more implementations, one or more of the management entities 102A-E may include, and/or may be coupled to, multiple different network interfaces, such as a WiFi network interface, a Bluetooth network interface, a coaxial network interface, an Ethernet network interface, a power line network interface, an optical network interface, other radio frequency (RF) interfaces, such as Zigbee, etc., or generally any interface and/or communication protocol that facilitates communicatively coupling one or more of the management entities 102A-E with one or more of the devices 104A-L. In one or more implementations, one or more of the management entities 102A-E, such as the management entity 102E, may be, and/or may include, home gateway devices such as set top boxes (STBs). In one or more implementations, one or more of the management entities 102A-E may be, and/or may be part of, any device that communicatively couples to at least one other device, such as a mobile phone, a tablet, a smart appliance, a security system, a router, a wireless access point, or generally any device that communicatively couples to at least one other device.

In one or more implementations, one or more of the management entities 102A-E may be communicatively coupled (e.g. wired or wirelessly) to one or more of the devices 104A-L through one or more of the networks 101A-D. For exemplary purposes, the networks 101A-D are illustrated as each including multiple of the devices 104A-L; however, one or more of the networks 101A-D may include only one of the devices 104A-L. In one or more implementations, one or more of the networks 101A-D may be, or may include, one or more of a bus network, a star network, a ring network, a relay network, a mesh network, a star-bus network, a tree or hierarchical network, and the like. In FIG. 1, the management entity 102A may form a wired and/or wireless network 101A with the devices 104A-C, the management entity 102B may form a wired and/or wireless network 101B with the devices 104D-F, the management entity 102C may form a wired and/or wireless network 101C with the devices 104G-I, and the management entity 102D may form a wired and/or wireless network 101D with the devices 104J, K. In one or more implementations, there may be multiple paths between one or more of the management entities 102A-E and the devices 104A-L. In one or more implementations, there may be multiple paths between one or more of the devices 104A-L and/or the management entities 102A-E, and the network 106.

In one or more implementations, one or more of the devices 104A-C of the network 101A may exclusively communicate with the one or more of the management entities 102B-E through the management entity 102A, one or more of the devices 104D-F of the network 101B may exclusively communicate with one or more of the management entities 102A, C-E through the management entity 102B, one or more of the devices 104G-I of the network 101C may exclusively communicate with one or more of the management entities 102A, B,D,E through the management entity 102C, and one or more of the devices 104K,J of the network 101D may exclusively communicate with one or more of the management entities 102A-C,E through the management entity 102D.

In one or more implementations, one or more of the management entities 102A-E, such as the management entity 102A, may be communicatively coupled to one or more of the devices 104A-L, such as the device 104A, through one or more of the other devices 104B-L, such as the device 104B. In one or more implementations, one or more of the management entities 102A-E, such as the management entity 102D, may be communicatively coupled to one or more of the devices 104A-L, such as the devices 104G-I, through one or more of the other management entities 102B-E, such as the management entity 102C. In one or more implementations, one or more of the management entities 102A-E, such as the management entity 102D, may be communicatively coupled to one or more of the devices 104A-L, such as the device 104L, through the network 106. In one or more implementations, one or more of the management entities 102A-E, such as the management entity 102C, may be communicatively coupled to the network 106 through one or more of the other management entities 102A,B,D,E such as the management entity 102D.

In one or more implementations, one or more of the networks discussed herein may refer to the network 106, a portion of the network 106, one or more of the networks 101A-D, and/or a portion of one or more of the networks 101A-D. In one or more implementations, the management entities discussed herein may refer to one or more of the management entities 102A-E and/or a portion of one or more of the management entities 102A-E. In one or more implementations, the devices discussed herein may refer to one or more of the devices 104A-L, and/or a portion of one or more of the devices 104A-L.

One or more of the devices 104A-L may be configured to transmit data, such as data generated from measured physical quantities, in different formats and/or at different times, such as at periodic intervals, e.g. every millisecond, every second, every minute, etc., on a periodic basis based at least on operating parameters/variables of one or more of the devices 104A-L, e.g. power constraints, at times determined based at least on fluctuations in measured physical quantities, at times determined based at least on network connection availability, such as transient network connection availability, and/or at times determined based at least on network bandwidth availability, such as during off-peak hours.

The management entities 102A-E may initially operate independently of one another to manage and/or coordinate the devices 104A-L. For example, the management entity 102A may discover the devices 104A-C that are part of the network 101A with the management entity 102A and the management entity 102A may provide addresses, such as network identifiers, to the devices 104A-C. The devices 104A-C may provide device attributes to the management entity 102A. In one or more implementations, device attributes may include one or more of processing resources, memory resources, display resources, sensor resources, e.g. available sensors, transmission resources, e.g. available network interfaces (transmitters/receivers) and properties thereof, such as available transmission frequencies, available transmission power levels, etc., power resources, e.g. battery powered, power line powered, etc. The management entity 102A may analyze the device attributes and determine the operations that can be performed by the devices 104A-C. In one or more implementations, the devices 104A-C may provide an indication of the operations that can be performed to the management entity 102A.

The management entity 102A may receive a request, e.g. from an application and/or device, for a service to be performed by one or more of the devices 104A-C. For example, the management entity 102A may receive a request for the sensors to provide measured sensor data on a periodic basis. In one or more implementations, the management entity 102A may be part of a device, such as a home security system, that may be configured to perform services by default, such as reporting sensor data. Thus, in one or more implementations, the management entity 102A may be configured to initialize the services to be performed without receiving a request therefor.

The management entity 102A may analyze the request for the service to determine the resources used to perform the service, such as sensor resources, processing resources, etc. Thus, one or more of the management entities 102A-E may be referred to as resource capability adjudicators with respect to the network 106, and/or the networks 101A-D. In one or more implementations, the request for the service may indicate the resources used to perform the service and/or may identify one or more of the devices 104A-C used to perform the service. The management entity 102A may then determine one or more of the devices 104A-C, e.g. based at least on the received attributes of the devices 104A-C, such as the devices 104A-B, that have the appropriate resources to perform the requested service. The management entity 102A may generate device operating policies for the devices 104A-B that indicate the operations to be performed by the devices 104A-B to provide the requested service without interfering, e.g. wirelessly, with each other. The management entity 102A may provide the device operating policies to the devices 104A-B. The management entity 102A may store, e.g. in a memory, the resources of the devices 104A-B that have been allocated to performing the service. Thus, if the management entity 102A subsequently receives a request to perform another service, the management entity 102A can account for resources of the devices 104A-B that were previously allocated to the service, assuming that the service is still being performed.

In one or more implementations, a device operating policy may indicate a transmission protocol, a transmission power level, a transmission timeslot, a transmission frequency, a transmission periodicity, a measurement periodicity, a destination device, positional information for transmitting to the destination device, such as beam forming information, one or more processing algorithms or instructions, or generally any information that may configure the operation of the devices 104A-C, e.g. to perform a requested service. In one or more implementations, a device operating policy may be a file, such as a text file with configuration parameters, an extensible markup language (XML) file, an operating parameters file, or generally any file that may convey operating information to one or more of the devices 104A-C. In one or more implementations, rather than, or in addition to, providing the device operating policies to the devices 104A-C, the management entity 102A may remotely configure the devices 104A-C based at least on the device operating policies, such as by transmitting commands and/or instructions to the devices 104A-C to configure the devices 104A-C. Thus, the management entity 102A may be configured to communicate with and/or program one or more of the devices 104A-C, e.g. across multiple device and/or communication protocols.

If any of the devices 104A-C experience interference, e.g. wireless interference, while performing a service as indicated by one or more device operating policies, the devices 104A-C may report the interference to the management entity 102A. The management entity 102A may adjust the device operating policies of one or more of the devices 104A-C to minimize and/or prevent the interference. For example, the management entity 102A may adjust one or more of a transmission power level, a transmission frequency, and/or a transmission timeslot of the device operating policies of one or more of the devices 104A-C.

The other management entities 102B-E may initially operate in a similar manner. However, one or more of the management entities 102A-E, such as the management entity 102A, may continually, e.g. periodically, perform a discovery protocol to determine whether any other management entities 102B-E are, and/or can be, communicatively coupled to the management entity 102A, such as via one or more communication protocols supported by multiple of the management entities 102A-E and/or one or more communication paths between one or more of the management entities 102A-E. In one or more implementations, the management entity 102A may discover, e.g. through the network 106, that the management entity 102A can be communicatively coupled to the management entity 102E.

The management entities 102A,E may perform a negotiation protocol to determine which of the management entities 102A,E should be the primary management entity and which should be the secondary management entity. In one or more implementations, one or more of the management entities 102A-E is configurable to operate as a primary management entity or a secondary management entity. The negotiation protocol may include providing indications of available resources of devices being managed, e.g. connectivity, processing, memory, etc., providing indications of number of connected devices, providing indications of number of service requests received, providing indications of whether either of the management entities 102A,E is currently operating as a primary management entity with respect to another of the management entities 102B,C,D, etc. In one or more implementations, the management entity 102E may be communicatively coupled to a cloud of computers, and/or may receive a large number of service requests and therefore the management entities 102A,E may determine that the management entity 102E should operate as the primary management entity. In one or more implementations, if the management entity 102E is already operating as a primary management entity, and the management entity 102A is not operating as a primary management entity, the management entities 102A,E may skip the negotiation protocol and the management entity 102E may continue operating as the primary management entity with the management entity 102A operating as a secondary management entity. An example process of a management entity operating as a secondary management entity is discussed further below with respect to FIG. 3, and an example process of a management entity operating as a primary management entity is discussed further below with respect to FIG. 4.

If the management entity 102E is operating as the primary management entity with respect to the management entity 102A, the management entity 102A may provide the management entity 102E with the attributes of the devices 104A-C and any device operating policies for the devices 104A-C. In one or more implementations, the management entity 102E may also negotiate to operate as the primary management entity with respect to the management entities 102B,D. Thus, the management entity 102E may receive the attributes and device operating policies for the devices 104A-K of the networks 101A-D.

The management entity 102C may not be directly coupled to the network 106 and/or the management entity 102E; however, the management entity 102C may be directly coupled to the management entity 102D. In one or more implementations, the management entity 102C may negotiate with the management entity 102D for the management entity 102D to be the primary management entity with respect to the management entity 102C. Thus, the management entity 102C may provide the attributes and any device operating policies of the devices 104G-I to the management entity 102D. However, the management entity 102D may also have negotiated with the management entity 102E for the management entity 102E to be the primary management entity with respect to the management entity 102D. Thus, the management entity 102D may provide the attributes and operating policies of the devices 104G-I (received from the management entity 102C) to the management entity 102E. In one or more implementations, the management entity 102E may effectively operate as the primary management entity with respect to the management entity 102C transparently to the management entity 102C, e.g. the management entity 102C may believe that the management entity 102D is operating as the primary management entity. In one or more implementations, the management entity 102E may be unaware of the existence of the management entity 102C, e.g. the devices 104G-I may appear to the management entity 102E to be communicatively coupled to the management entity 102D.

Thus, the management entity 102E may have a universal perspective of the networks 101A-D, and the attributes and device operating policies of the devices 104A-K. The management entity 102E may determine whether the device operating policies of any of the devices 104A-K should be adjusted, e.g. to minimize interference and/or to optimize the transmission paths used by the devices 104A-K. If the management entity 102E determines that the device operating policies of any of the devices 104A-K should be adjusted, the management entity 102E may provide adjusted device operating policies to the management entities 102A,B,D corresponding to the devices 104A-K, and the management entities 102A,B,D may provide the adjusted device operating policies to the devices 104A-K. If the management entity 102E determines that the device operating policies of any of the devices 104G-I, such as the device 104G, should be adjusted, the management entity 102E may adjust the device operating policy and provide the adjusted device operating policy to the management entity 102D. The management entity 102D may subsequently provide the device operating policy to the management entity 102C, and the management entity 102C may provide the adjusted device operating policy to the device 104G.

The management entities 102A-D may forward requested services to the management entity 102E, such as services requested by applications, agents, other management entities, and/or devices. In one or more implementations, the management entity 102C may first forward requested services to the management entity 102D and the management entity 102D may forward the requested service to the management entity 102E. The management entity 102E may determine, from a universal network perspective, the appropriate devices 104A-K to perform operations for providing requested service, and may generate and/or adjust device operating policies for the devices 104A-K based at least on the determined operations.

If one or more the devices 104A-K experiences interference, e.g. intolerable interference, the devices 104A-K may provide an indication of the interference to the corresponding management entities 102A-D and the indication may subsequently be provided to the management entity 102E. The management entity 102E may determine, from a universal network perspective, one or more adjusted device operating policies to minimize and/or reduce the interference. The management entity 102E may provide the adjusted device operating policies to the corresponding management entities 102A-D, and the management entities may subsequently provide the adjusted device operating policies to the devices 104A-K.

In one or more implementations, one or more of the management entities 102A-E, such as the management entity 102E, may determine that the network 106 is becoming congested and/or overloaded from traffic generated by one or more of the devices 104A-L. For example, the management entity 102E may perform deep packet inspection on packets transmitted over the network 106 to identify indications of congestion at the transport layer, such as a number of retransmission requests that satisfies a congestion threshold. The management entity 102E may analyze the services being performed by the devices 104A-L to determine whether any of the services is associated with a variable attribute, e.g. an adjustable attribute, that may be adjusted to reduce the bandwidth consumed by the service while still providing the service, such as a video quality level of a video service. If the management entity 102E determines that one of the services is associated with a variable attribute, the management entity 102E may adjust the device operating policies of one or more of the devices 104A-L providing the service to reduce the bandwidth consumed by the service and alleviate the congestion. An example process by a management entity 102E to alleviate network congestion is discussed further below with respect to FIG. 5.

In one or more implementations, the one or more management entities 102A-E may include intelligence for dispatching tasks across different languages, service providers, country policies, etc. For example, the management entity 102E may include a root of trust and may dispatch an agent authorized by the root of trust to perform one or more tasks across disparate networks, e.g. retrieve data from a disparate network. The agent may be configured to communicate in multiple different languages, using multiple different protocols, etc.

Figure 2:
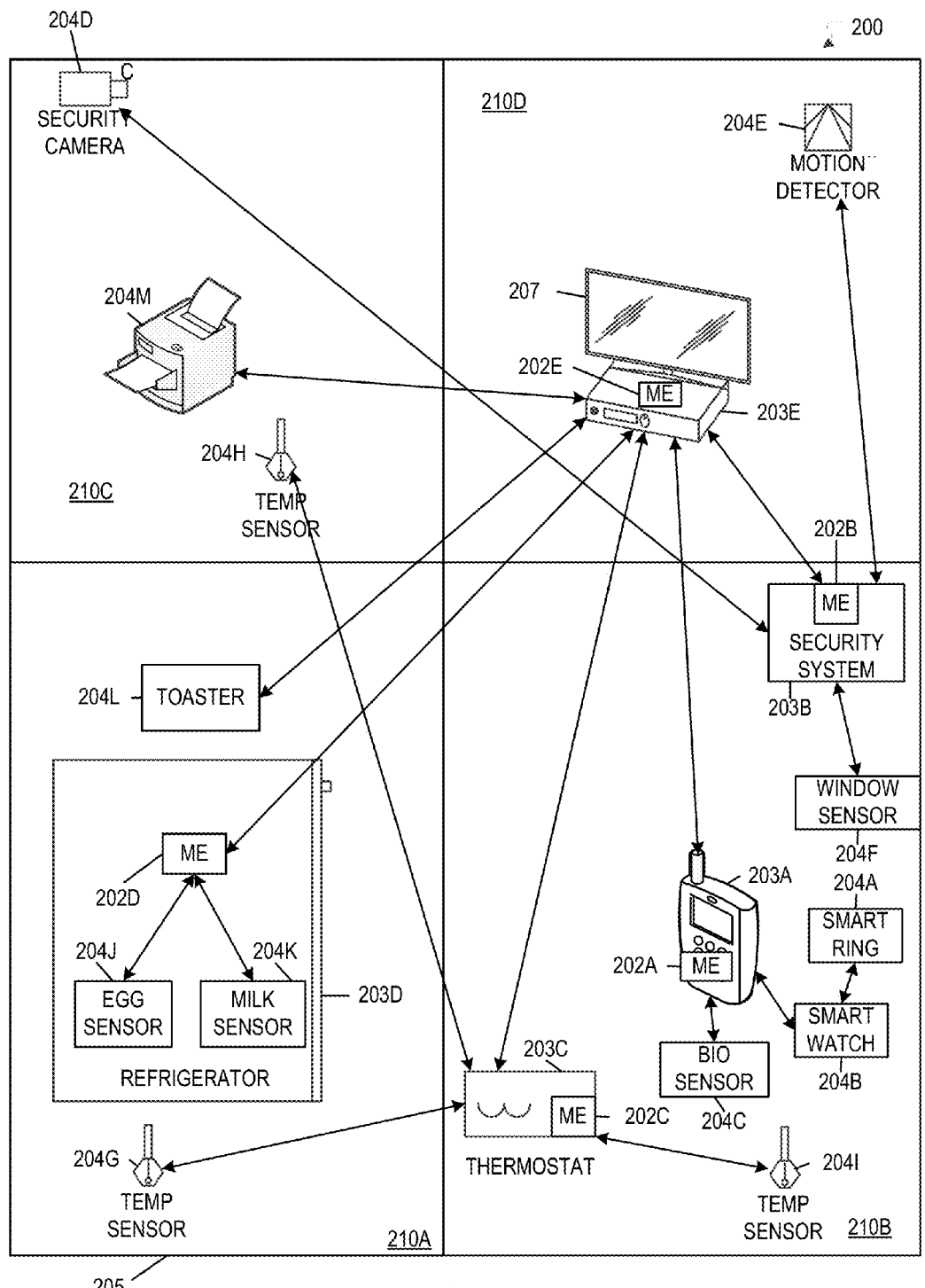
FIG. 2 illustrates an example home network environment in which a system for hierarchical management of devices can be implemented in accordance with one or more implementations.

FIG. 2 illustrates an example home network environment 200 in which a system for hierarchical management of devices can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The home network environment 200 includes a building 205, such as a home. The building 205 includes rooms 210A-D. The room 210A may include a smart toaster device 204L, a temperature sensor device 204G, and a smart refrigerator device 203D that includes an egg sensor device 204J and a milk sensor device 204K. The room 210B may include a smart thermostat device 203C, a smart phone device 203A, a bio-sensor device 204C, a smart ring device 204A, a smart watch device 204B, a window sensor device 204F, and a security system device 203B. The smart thermostat device 203C may include a management entity 202C, the smart phone device 203A may include a management entity 202A, and the security system device 203B may include a management entity 202B. The room 210C may include a security camera device 204D, a printer device 204M, and a temperature sensor device 204H. The room 210D may include a motion detector device 204E, a set-top box device 203E, and a display device 207. The set-top box device 203E may include a management entity 202E and may also operate as a gateway device. For example, the set-top box device 203E may be configured to communicatively couple one or more of the devices 203A-E, 204A-M, wired and/or wirelessly, to an external network, such as the internet, and/or may receive audio-video programs and present the audio-video programs on the display device 207. One or more of the devices 203A-E, 204A-M may include one or more processing resources, such as processors, memory resources, communication interfaces, sensor resources, etc.

The management entities 202A-E may negotiate such that, by way of example, the management entity 202E operates as the primary management entity with respect to the other management entities 202A-D, e.g. the set-top box device 203E that contains the management entity 202E may be communicatively coupled to an external network and may have an empirically determinable permanent presence in the building 205, as opposed to the smart phone device 203A which may also be coupled to an external network but may have an empirically determinable transient presence in the building 205.

The smart phone device 203A may be communicatively coupled to the bio-sensor device 204C, the smart watch device 204B, the smart ring device 204A, and the set-top box device 203E. The bio-sensor device 204C, the smart watch device 204B, and the smart ring device 204A may be wearable devices that may, along with the smart phone device 203A, have a transient presence in the building 205. Thus, when the smart phone device 203A, and associated devices 204A-C are not in the building 205 (and/or not within proximity of other management entities), the management entity 202A of the smart phone device 203A may manage the devices 204A-C. However, when the smart phone device 203A is within and/or proximal to the building 205, the management entity 202A of the smart phone device 203A may negotiate with the management entity 202E of the set-top box device 203E such that the management entity 202E operates as the primary management entity for the devices 104A-C. Thus, the management entities 202A-D operating as secondary management entities may periodically poll or otherwise monitor the management entity 202E operating as the primary management entity to verify that the management entity 202E is available to manage the devices 204A-M. In one or more implementations, the management entity 202A of the smart phone device 203A may use positioning information, e.g. from a global positioning system (GPS) to determine when the management entity 202A of the smart phone device 203A is within a proximity of the management entity 202E and/or other management entities.

In one or more implementations, the management entity 202A may be embedded in the smart phone device 203A. In one or more implementations, the smart ring device 204A may be communicatively coupled to the smart watch device 204B via a first communication protocol, such as a Zigbee communication protocol, the smart watch device 204B may be communicatively coupled to the smart phone device 203A via a second communication protocol, such as a Bluetooth communication protocol, and the bio-sensor device 204C may be communicatively coupled to the smart phone device 203A via a third communication protocol, such as a network communication protocol that operates in the 2.4 GHz frequency of the industrial, scientific, and medical allocation of the radio frequency spectrum (ISM band). The smart phone device 203A may also be communicatively coupled to the set-top box device 203E via a fourth network protocol, such as a WiFi communication protocol. The smart phone device 203A may also be coupled to an external network, such as the Internet, via a fifth communication protocol, such as a cellular communication protocol, e.g. a long-term evolution (LTE) communication protocol. Thus, the smart phone device 203A may have multiple paths to the Internet, or other external networks, e.g. through the cellular communication protocol and through the WiFi communication protocol via the set-top box device 203E.

The security system device 203B may be communicatively coupled to one or more security devices, such as the window sensor device 204F, the motion detector device 204E, and the security camera device 204D, in addition to the set-top box device 203E. The smart thermostat device 203C may be communicatively coupled to one or more temperature sensor devices 204G-I, in addition to the set-top box device 203E. The smart refrigerator device 203D may be communicatively coupled to the egg sensor device 204J and the milk sensor device 204K, in addition to the set-top box device 203E. The egg sensor device 204J and/or the milk sensor device 204K may include sensor devices and wireless interfaces for communicating with the smart refrigerator device 203D. For example, the egg sensor device 204J and/or the milk sensor device 204K may periodically report to the smart refrigerator device 203D the amount of eggs and/or milk remaining and/or whether the eggs and/or milk have spoiled. The management entities 202B-D of the security system device 203B, the smart thermostat device 203C, and the smart refrigerator device 203D, respectively, may negotiate with the management entity 202E of the set-top box device 203E such that the management entity 202E operates as the primary management entity for the devices 204D-L. The smart toaster device 204L and the printer device 204M may be communicatively coupled to the set-top box device 203E, e.g. via WiFi interfaces. Thus, the management entity 202E of the set-top box device 203E may manage the smart toaster device 204L and the printer device 204M.

In one or more implementations, one or more of the management entities 202A-E may be implemented in software (e.g., subroutines and code). In one or more implementations, one or more of the management entities 202A-E may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
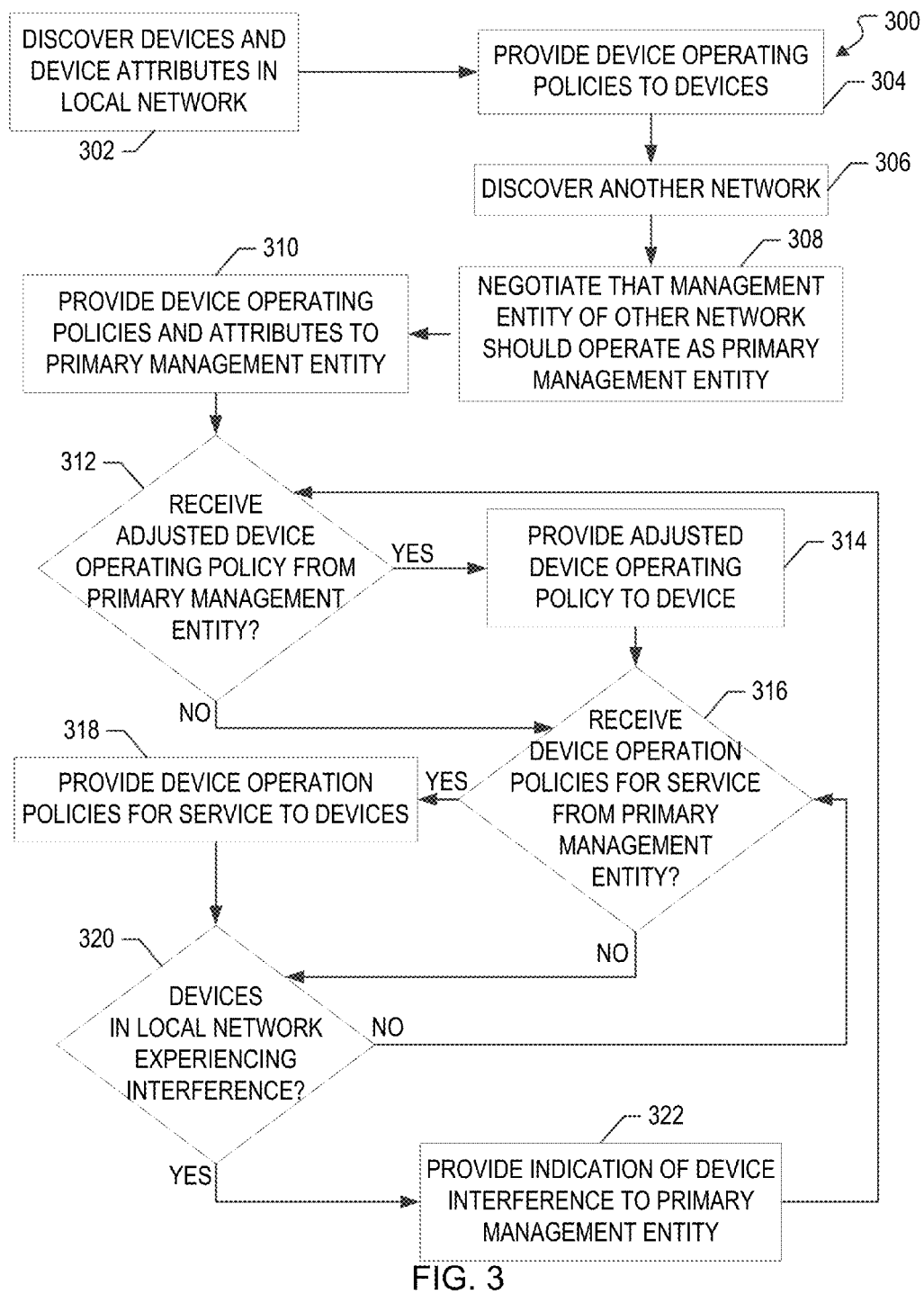
FIG. 3 illustrates a flow diagram of an example process of a management entity operating as a secondary management entity in a system for hierarchical management of devices in accordance with one or more implementations.

FIG. 3 illustrates a flow diagram of an example process 300 of a management entity 202D operating as a secondary management entity in a system for hierarchical management of devices in accordance with one or more implementations. For explanatory purposes, the example process 300 is primarily described herein with reference to the management entity 202D of FIG. 2; however, the example process 300 is not limited to the management entity 202D of FIG. 2, and the example process 300 can be performed by one or more other components of the management entity 202D. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The management entity 202D that resides in the smart refrigerator device 203D discovers one or more devices, such as the egg sensor device 204J and the milk sensor device 204K, that are coupled to the smart refrigerator device 203D in a local network, along with attributes of the devices 204J-K (302). For example, the management entity 202D and/or the smart refrigerator device 203D may periodically implement a discovery protocol to search for devices 204J-K. In one or more implementations, the management entity 202D may be configured, e.g. using an interface, with information for connecting to one or more of the devices 204J-K. In one or more implementations, one or more of the devices 204J-K may provide the attributes of the devices 204J-K to the management entity 202D and/or the operations that can be performed by the devices 204J-K.

The management entity 202D determines device operating policies for the devices 204J-K based at least on the attributes of the devices 204J-K and/or services provided by the smart refrigerator device 203D, and provides the device operating policies to the devices 204J-K (304). For example, the devices 204J-K may be configured with device operating policies for transmitting the amount of eggs and/or milk remaining at periodic intervals such that the transmissions do not interfere with each other. The management entity 202D discovers another network and/or another management entity 202E (306). For example, the management entity 202D may periodically perform a discovery protocol for discovering other devices 204A-I,L,M that are already associated with other management entities 202A-C,E and/or other management entities 202A-C,E. If the management entity 202D discovers the smart toaster device 204L that is already associated with another management entity 202E, the management entity 202D may request a communication path to the management entity 202E from and/or via the smart toaster device 204L.

The management entity 202D participates in a negotiation with the management entity 202E to determine which of the management entities 202D-E will operate as the primary management entity, and, by way of example, the negotiation determines that the management entity 202E will operate as, and may be referred to as, the primary management entity 202E, and the management entity 202D will operate as, and may be referred to as, the secondary management entity 202D (308). The secondary management entity 202D provides the operating policies and attributes of the devices 204J,K, along with an indication of any services being performed by the devices 204J,K, to the primary management entity 202E (310).

If the primary management entity 202E determines that the device operating policies of one or more of the devices 204J, K, such as the device 204J, may cause the devices 204J,K to conflict, and/or the devices 204J,K are conflicting with, e.g. interfering with, the other devices 204A-I,L,M, the secondary management entity 202D receives an adjusted device operating policy for the device 204J from the primary management entity 202E (312). The secondary management entity 202D then provides the adjusted device operating policy to the device 204J (314).

If the secondary management entity 202D receives, from the primary management entity 202E, new and/or adjusted device operating policies for one or more of the devices 204J,K to provide a service (316), the secondary management entity 202D provides the device operating policies for the service to the devices 204J-K (318). If the secondary management entity 202D determines that one or more of the devices 204J,K in the local network are experiencing interference (320), the secondary management entity 202D provides an indication of the interference to the primary management entity 202E (322). For example, one or more of the devices 204J,K may provide an indication to the management entity 202E that they are experiencing interference, and/or the set-top box device 203E may provide an indication to the management entity that one or more of the devices are experiencing interference.

If the primary management entity 202E determines that the interference can be alleviated by adjusting the device operating policies of one or more of the devices 204J,K, such as the device 204J, the secondary management entity 202D receives an adjusted operating policy for the device 204J from the primary management entity 202E, and provides the adjusted operating policy to the device 204J (312).

Figure 4:
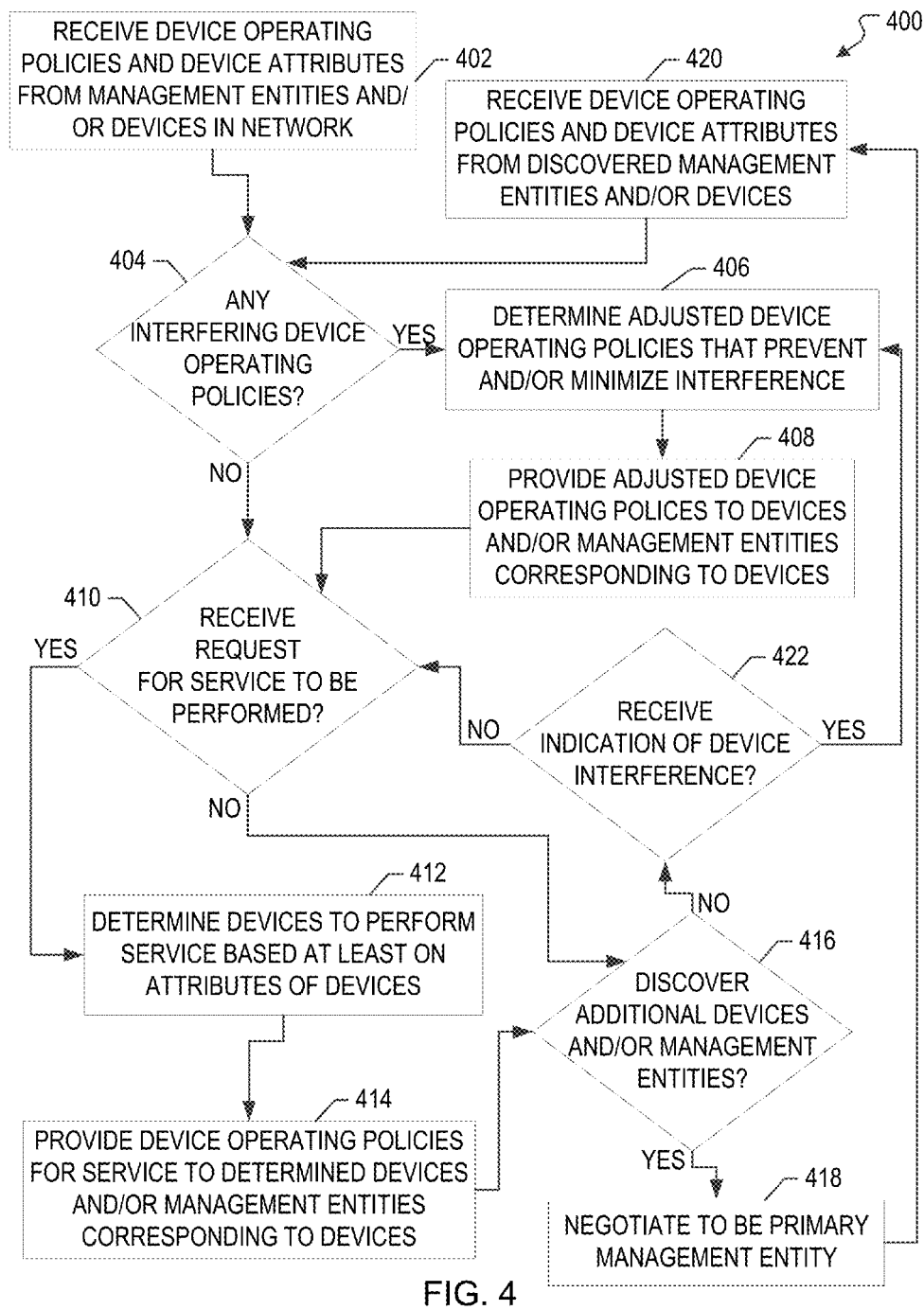
FIG. 4 illustrates a flow diagram of an example process of a management entity operating as a primary management entity in a system for hierarchical management of devices in accordance with one or more implementations.

FIG. 4 illustrates a flow diagram of an example process 400 of a management entity 202E operating as a primary management entity in a system for hierarchical management of devices in accordance with one or more implementations. For explanatory purposes, the example process 400 is primarily described herein with reference to the management entity 202E of FIG. 2; however, the example process 400 is not limited to the management entity 202E of FIG. 2, and the example process 400 can be performed by one or more other components of the management entity 202D. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The primary management entity 202E receives device operating policies and device attributes from discovered management entities 202B-D, and/or discovered devices 204L-M, in the network (402). For example, the primary management entity 202E may receive device operating policies and attributes for the devices 204D-K from the secondary management entities 202B-D. The primary management entity 202E determines whether any of the received device operating policies will result in one or more of the devices 204D-M interfering with one another (404). For example, the primary management entity 202E may determine whether the device operating policies of multiple devices 204D-M include the same transmission frequency and/or adjacent transmission frequencies and the same transmission time and/or the same transmission timeslot.

If the primary management entity 202E determines that the device operating policies of one or more of the devices 204D-M, such as the devices 204K-M, will result in the devices 204K-M interfering with one another (404), the primary management entity 202E determines one or more adjusted device operating policies that will prevent and/or minimizes the interference (406). The primary management entity 202E provides the one or more adjusted device operating policies to the devices 204L-M and to the secondary management entity 202D that corresponds to the milk sensor device 204K (408). The primary management entity 202E determines whether a request was received for a service to be performed, such as from an application, agent, and/or device (410). For example, the primary management entity 202E may receive a request for a service to be performed directly from an application and/or device, and/or one or more of the secondary management entities 202B-D may receive a request for a service to be performed and may forward the request to the primary management entity 202E.

If the primary management entity 202E receives a request for a service to be performed (410), the primary management entity 202E determines the resources that will be utilized to perform the service and one or more of the devices 204D-M, such as the devices 204G-M, that will perform at least a portion of the service, e.g. based at least on the attributes of the devices 204D-M and any resources of the devices 204D-M that are being used to perform other services (412). For example, the request may include an indication of, and/or the primary management entity 202E may determine, the resources that will be utilized to perform the service and the primary management entity 202E may determine the devices 204D-M that have the utilized resources available. In one or more implementations, if multiple of the devices 204D-M have the utilized resources available, the primary management entity 202E may determine the devices 204D-M that will minimize data transmitted over the network, e.g. the devices 204D-M that have the shortest path to transmit data for the service to the appropriate destination device.

The primary management entity 202E generates device operating policies for the determined devices 204G-M and provides the device operating policies to the devices 204L-M, and to the management entities 202B-C corresponding to the devices 204G-K (414). The primary management entity 202E may also periodically and/or continually perform a discovery protocol to discover additional devices, such as the devices 204A-C, and/or additional management entities, such as the management entity 202A (416). If the primary management entity 202E discovers one or more additional devices and/or management entities, such as the management entity 202A (416), the primary management entity 202E negotiates with the management entity 202A and determines, by way of example, that the primary management entity 202E should be the primary management entity with respect to the management entity 202A (418).

The primary management entity 202E may then receive the device operating policies and device attributes of the devices 204A-C that were being managed by the management entity 202A (420), and the primary management entity 202E may determine whether any of the device operating policies will result in the devices 204A-C interfering with, and/or otherwise conflicting with, the devices 204D-M (404). If the primary management entity 202E does not discover any additional devices and/or management entities (416), the primary management entity 202E determines whether one or more indications of device interference were received from one or more of the devices 204L-M and/or one or more of the secondary management entities 202A-D, e.g. on behalf of one or more of the devices 204A-K (422). If the primary management entity 202E receives an indication of device interference from one or more of the devices 204L-M and/or one or more of the secondary management entities 202A-D (422), the primary management entity 202E determines one or more adjusted device operating policies that prevent, mitigate, and/or minimize the interference (406) and provides the one or more adjusted device operating policies to the appropriate devices 204L-M and/or secondary management entities 202A-D.

Figure 5:
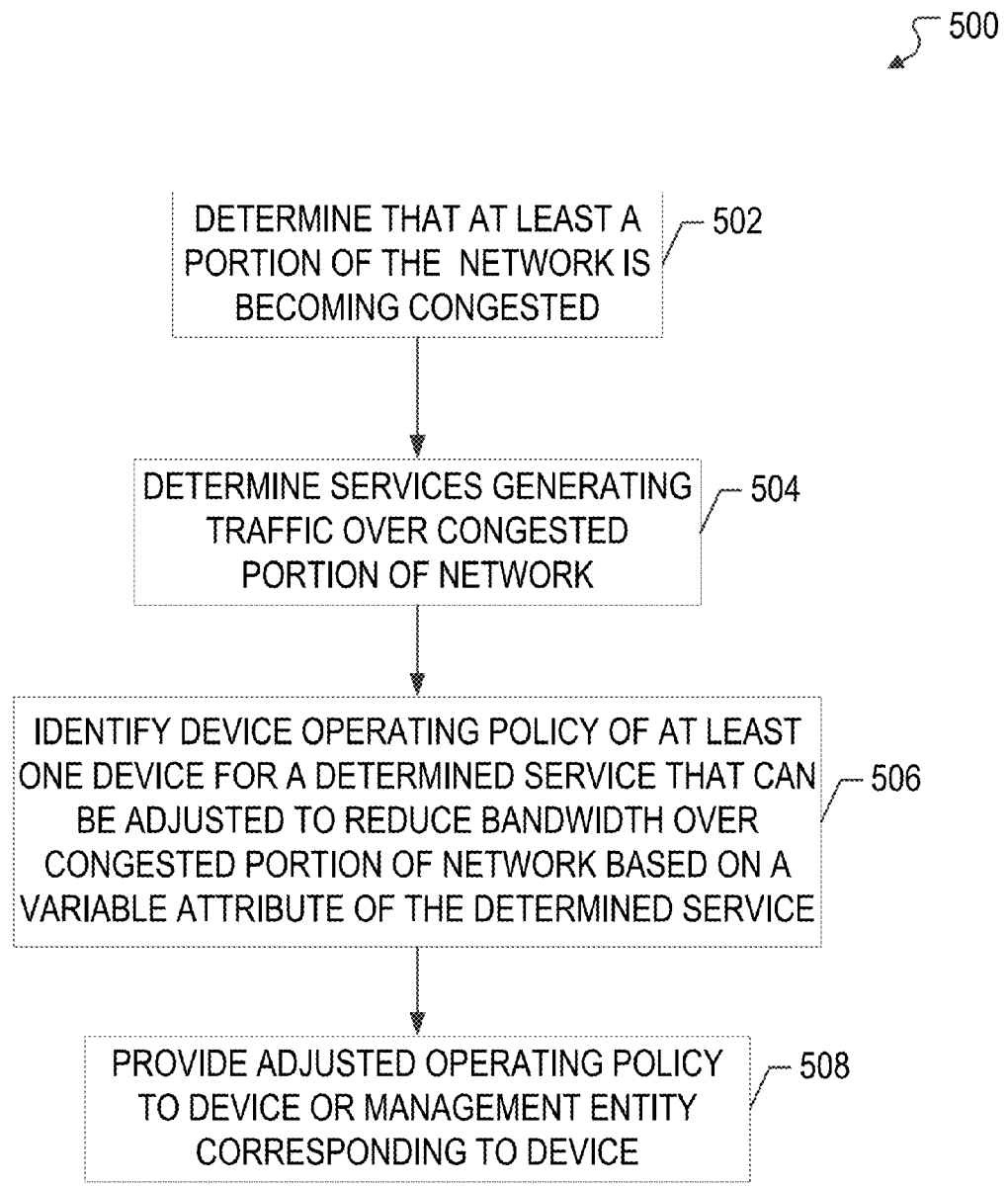
FIG. 5 illustrates a flow diagram of an example management process of a system for hierarchical management of devices in accordance with one or more implementations.

FIG. 5 illustrates a flow diagram of an example management process 500 of a system for hierarchical management of devices in accordance with one or more implementations. For explanatory purposes, the example process 400 is primarily described herein with reference to the management entity 202E of FIG. 2; however, the example process 400 is not limited to the management entity 202E of FIG. 2, and the example process 400 can be performed by one or more other components of the management entity 202D. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The primary management entity 202E determines that at least a portion of the network 106 is becoming congested (502). For example, the management entity 202E may perform deep packet inspection, and/or packet header inspection, to monitor the number of retransmission requests transmitted across the network. In one or more implementations, the management entity 202E may receive an indication of the congestion from an application and/or device. The primary management entity 202E determines the services being performed by one or more of the devices 204A-M that are generating traffic over the network 106 (504). For example, the primary management entity 202E may retrieve information regarding the services being provided from memory.

The primary management entity 202E identifies, based at least on a variable attribute associated with at least one of the services, a device operating policy of at least one of the devices 204A-M, such as the security camera device 204D, that can be adjusted to reduce the bandwidth over the congested portion of the network (506). For example, one or more of the services may be associated with variable attributes, such as a video quality level, that can be adjusted by the primary management entity 202E based at least on available resources. The primary management entity 202E adjusts the device operating policy of the security camera device 204D, such that the security camera device 204D will provide video having a lower quality level, and provides the adjusted device operating policy to the device 204J (508).

Figure 6:
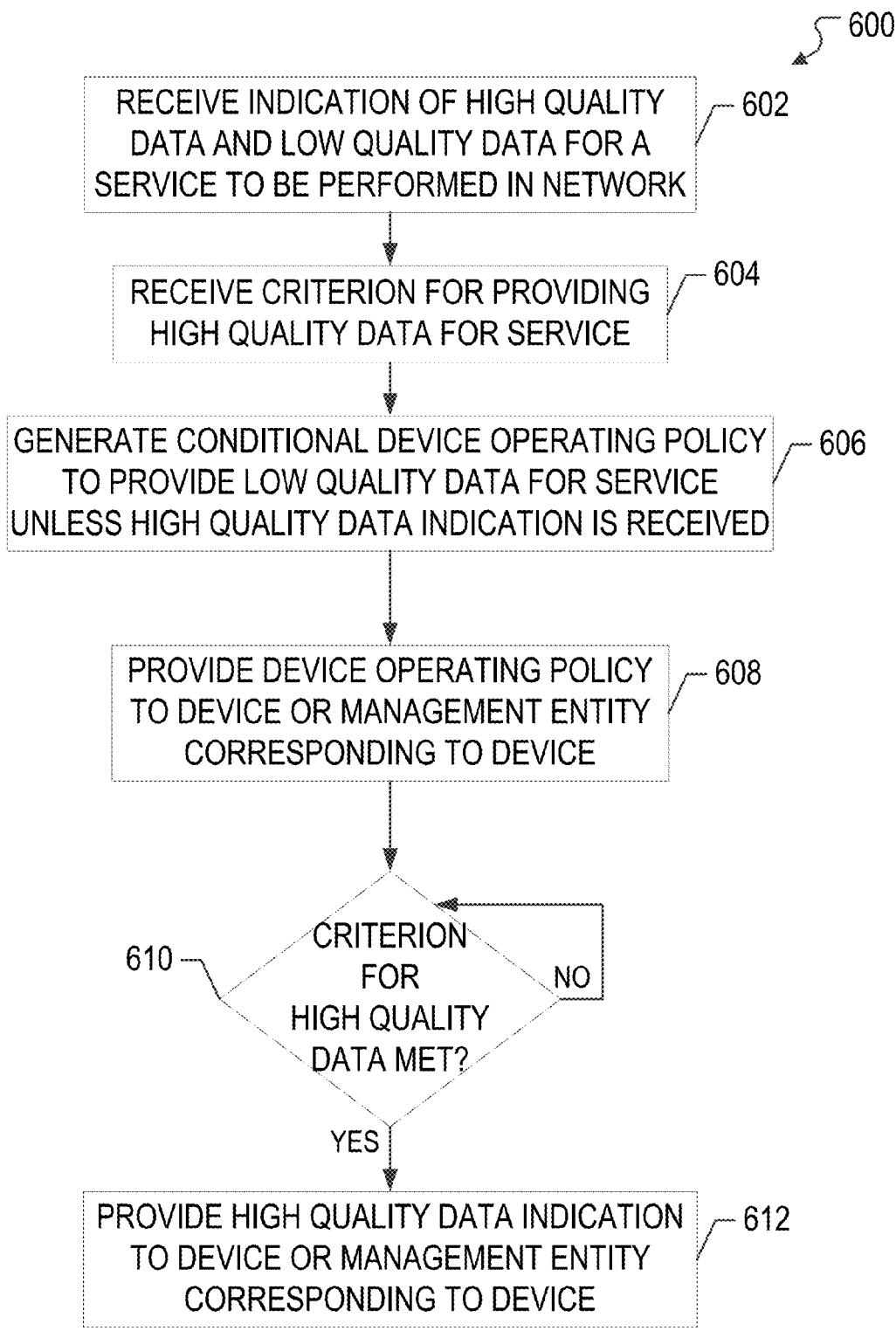
FIG. 6 illustrates a flow diagram of an example management process of a system for hierarchical management of devices in accordance with one or more implementations.

FIG. 6 illustrates a flow diagram of an example management process 600 of a system for hierarchical management of devices in accordance with one or more implementations. For explanatory purposes, the example process 600 is primarily described herein with reference to the management entity 202E of FIG. 2; however, the example process 600 is not limited to the management entity 202E of FIG. 2, and the example process 600 can be performed by one or more other components of the management entity 202D. Further for explanatory purposes, the blocks of the example process 600 are described herein as occurring in serial, or linearly. However, multiple blocks of the example process 600 may occur in parallel. In addition, the blocks of the example encoding process 600 may be performed a different order than the order shown and/or one or more of the blocks of the example process 600 may not be performed.

The primary management entity 202E receives an indication of high quality data and low quality data for a service to be performed in the network 106 (602). The primary management entity 202E may receive a criterion that indicates when the high quality data should be provided for the service (604). In one or more implementations, the indication of the high and low quality data and/or the criterion may be provided with the request for the service. In one or more implementations, the primary management entity 202E may determine the criterion based at least on heuristics. In one or more implementations, the low quality data may be heart rate data, e.g. provided by the bio-sensor device 204C, while the high quality data may be electrocardiogram (EKG) data provided by the bio-sensor device 204C, and the criterion may be met when a blood pressure reading, e.g. as provided by another device, such as the smart ring device 204A, reaches a threshold value.

The primary management entity 202E generates a conditional device operating policy for providing low quality data for the service, such a heart rate data, unless a high quality data indication is received, and then provide high quality data for the service, such as EKG data (606). The primary management entity 202E provides the device operating policy to the bio-sensor device 204C (608). The primary management entity 202E determines whether the criterion for the high quality data has been met, such as whether a blood pressure reading provided by the smart ring device 204A reaches a threshold value (610). In one or more implementations, the conditional device operating policy may configure the bio-sensor device 204C to communicate directly with the smart ring device 204A to determine whether the criterion has been met.

If the primary management entity 202E determines that the criterion for high quality data has been met (610), the primary management entity 202E provides the high quality data indication to the bio-sensor device 204C (612). The bio-sensor device 204C may subsequently begin transmitting high quality data, such as EKG data, e.g. until a low quality data indication is received. Since the high quality data consumes additional processing and network resources than the low quality data, the primary management entity 202E is able to conserve processing and network resources by configuring the bio-sensor device 204C to provide the low quality data until the high quality data indication is received. In one or more implementations, if multiple communication paths are available for transmitting the high quality data and/or low quality data to a destination device, the high quality data may be transmitted over the shortest and/or most reliable communication path, while the low quality data may be transmitted over the communication path associated with the lowest system cost irrespective of reliability and/or transmission time, e.g. the communication path that has the most available bandwidth, etc.

Figure 7:
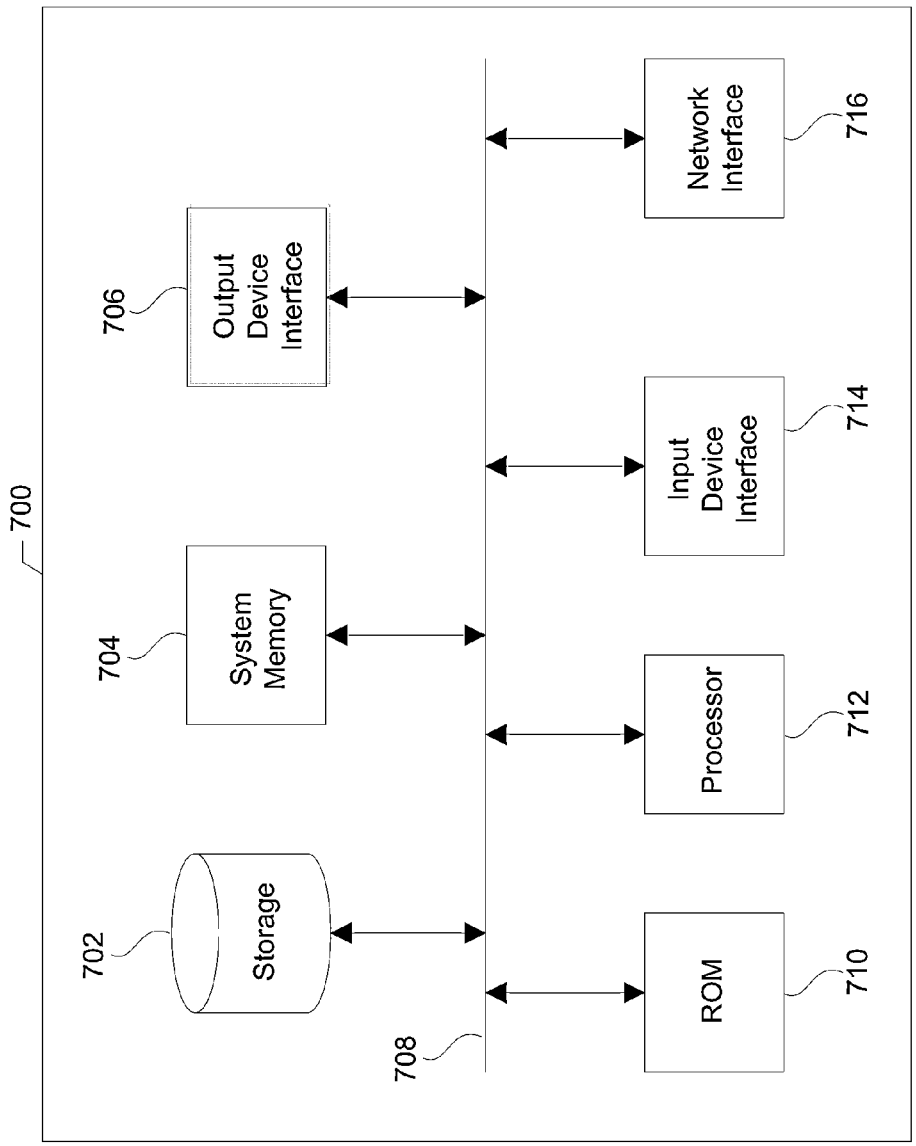
FIG. 7 conceptually illustrates an electronic system with which one or more implementations of the subject technology can be implemented.

FIG. 7 conceptually illustrates an example electronic system 700 with which one or more implementations of the subject technology can be implemented. The electronic system 700, for example, can be a gateway device, a set-top box, a desktop computer, a laptop computer, a tablet computer, a server, a switch, a router, a base station, a receiver, a phone, a personal digital assistant (PDA), and/or generally any electronic device that transmits signals over a network. The electronic system 700 can be, and/or can be a part of, one or more of the management entities 102A-E, 202A-E and/or one or more of the devices 104A-L, 204A-M. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieve instructions to execute and data to process in order to execute the processes of the subject disclosure. The one or more processing unit(s) 712 can be a single processor or a multi-core processor in different implementations.

The ROM 710 stores static data and instructions that are utilized by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as RAM. The system memory 704 may store one or more of the instructions and/or data that the one or more processing unit(s) 712 may utilize at runtime. In one or more implementations, the processes of the subject disclosure are stored in the system memory 704, the permanent storage device 702, and/or the ROM 710. From these various memory units, the one or more processing unit(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown) through one or more network interface(s) 716. The one or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 700 can be a part of one or more networks of computers (such as a local area network (LAN), a wide area network (WAN), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more implementations, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" can refer to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for hierarchical management of devices by a first management entity, the method comprising:
    configuring first devices of a first network with first device operating policies to perform first device operations based in part on first device attributes of the first devices, wherein the first device operating policies prevent interference between the first devices while performing the first device operations;
    discovering a second network of second devices that are managed by a second management entity;
    participating in a negotiation with the second management entity to determine whether the second management entity will operate as a primary management entity for the first devices of the first network and the second devices of the second network;
    receiving second device operating policies and second device attributes of the second devices of the second network when the negotiation determines that the second management entity will not operate as the primary management entity;
    determining whether the second device operating policy of at least one of the second devices will cause interference with at least one of the first devices;
    providing an adjusted second device operating policy for the at least one of the second devices to the second management entity when the second device operating policy of the at least one of the second devices will cause interference with at least one of the first devices, the adjusted second device operating policy being based at least on the second device attributes of the at least one second device; and
    determining that at least one of the first devices is experiencing interference and providing an indication to the second management entity that the at least one of the first devices is experiencing the interference when the negotiation determines that the second management entity will operate as the primary management entity.

2. The method of claim 1, further comprising:
discovering the first devices of the first network; and
receiving, from the first devices, the first device attributes of the first devices.

3. The method of claim 1, further comprising:
providing the first device operating policies and the first device attributes of the first devices to the second management entity when the negotiation determines that the second management entity will operate as the primary management entity.

4. The method of claim 3, wherein the negotiation determines that the second management entity will operate as the primary management entity, and the method further comprising:
receiving an adjusted first operating policy for at least one of the first devices from the second management entity; and
configuring the at least one of the first devices based at least on the adjusted first operating policy.

5. The method of claim 3, further comprising:
receiving an adjusted first operating policy for the at least one of the first devices from the second management entity;
configuring the at least one of the first devices based at least on the adjusted first operating policy; and
determining that the interference has been relieved for the at least one of the first devices.

6. The method of claim 1, further comprising:
determining service operations for performing a requested service;
determining at least one of the first devices and at least one of the second devices to perform the service operations based at least on the first device attributes of the first devices and the second device attributes of the second devices;
configuring the at least one of the first devices with an adjusted first operating policy to perform at least some of the service operations in addition to the first device operations of the at least one of the first devices; and
providing, to the second management entity, an adjusted second operating policy for configuring the at least one of the second devices to perform at least some of the service operations.

7. The method of claim 6, further comprising:
retrieving the adjusted first operating policy and the adjusted second operating policy from a resource that is external to the first and second networks.

8. The method of claim 1, further comprising:
discovering a third network of third devices that are managed by a third management entity; and
participating in another negotiation with the second management entity and the third management entity to determine whether the first management entity, the second management entity, or the third management entity will operate as the primary management entity for the first devices of the first network, the second devices of the second network, and the third devices of the third network.

9. The method of claim 1, wherein the first device attributes of at least one of the first devices comprises at least one of a power source attribute, a connectivity attribute, a processing attribute, or a memory attribute.

10. The method of claim 1, wherein the first device operating policy of at least one of the first devices indicates at least one of: a transmission frequency, a transmission power level, or a transmission time slot.

11. The method of claim 1, wherein the first management entity communicates with the second devices of the second network exclusively through the second management entity.

12. The method of claim 1, wherein the first device operating policies and the second device operating policies are associated with providing a requested service and the method further comprising:
determining that at least a portion of a third network, that is separate from the first and second networks, is becoming congested;
determining that at least one of the first devices is generating first traffic that is being transmitted over the at least the portion of the third network with respect to at least a portion of the requested service; and
configuring the at least one of the first devices with an adjusted first device operating policy that reduces the traffic being generated by the at least one of the first devices with respect to the at least the portion of the requested service, wherein the adjusted first device operating policy is determined based at least on a variable attribute of the requested service.

13. The method of claim 12, further comprising:
determining that at least one of the second devices is generating second traffic that is being transmitted over the at least the portion of the third network with respect to at least another portion of the requested service; and
providing, to the second management entity, another adjusted second device operating policy that reduces the traffic being generated by the at least one of the second devices with respect to the at least another portion of the requested service, wherein the another adjusted second device operating policy is determined based at least on the variable attribute of the requested service.

14. The method of claim 12, wherein the variable attribute of the requested service comprises a video quality level, and the adjusted first device operating policy for the at least one of the first devices indicates a lower bandwidth video quality level for the requested service than the first device operating policy for the at least one of the first devices.

15. The method of claim 12, wherein at least one of the second device operating policies of at least one of the second devices comprises a primary operating policy and a conditional operating policy, the conditional operating policy to be applied when an indication of network congestion is received, wherein the conditional operating policy indicates a video quality level that generates less traffic than the primary operating policy, and the method further comprising:
transmitting the indication of the network congestion to the second management entity.

16. The method of claim 1, further comprising:
configuring one of the first devices of the first network with a first device operating policy to provide high quality data for a requested service when a high quality data indication is received and otherwise to provide low quality data for the requested service;
determining whether a high quality data criterion of the requested service has been satisfied, wherein the high quality data criterion depends on at least one of the second devices of the second network; and
providing the high quality data indication to the one of the first devices when the high quality data criterion is satisfied.

17. The method of claim 16, further comprising:
receiving, from the second management entity, data generated by the at least one of the second devices; and
determining whether the high quality data criterion of the requested service has been satisfied based at least on the data generated by the at least one of the second devices, wherein the high quality data is associated with a greater bandwidth utilization than the low quality data.

18. A device comprising:
at least one processor circuit configured to:
configure first devices of a first network with first device operating policies to perform first device operations based in part on first device attributes of the first devices, wherein the first device operating policies prevent interference between the first devices while performing the first device operations;
discover a second network of second devices that are managed by a second management entity;
participate in a negotiation with the second management entity to determine whether the second management entity will operate as a primary management entity for the first devices of the first network and the second devices of the second network;
when the negotiation determines that the second management entity will operate as the primary management entity:
provide the first device operating policies and the first device attributes of the first devices to the second management entity, determine when at least one of the first devices is experiencing interference, and provide an indication to the second management entity when the at least one of the first devices is experiencing the interference; and
when the negotiation determines that the second management entity will not operate as the primary management entity:
receive second device operating policies and second device attributes of the second devices of the second; and
provide an adjusted second device operating policy for at least one of the second devices to the second management entity when the second device operating policy of the at least one of the second devices will cause interference with at least one of the first devices, the adjusted second device operating policy being based at least on the second device attributes of the at least one second device.

19. A computer program product comprising instructions stored in at least one non-transitory computer-readable storage medium, the instructions comprising:
instructions to configure first devices of a first network with first device operating policies to perform first device operations based in part on first device attributes of the first devices, wherein the first device operating policies prevent interference between the first devices while performing the first device operations, wherein at least one of the first device operating policies comprises an operating policy to provide high quality data for a requested service when a high quality data indication is received and otherwise to provide low quality data for the requested service;
instructions to discover a second network of second devices that are managed by a second management entity;
instructions to participate in a negotiation with the second management entity to determine whether the second management entity will operate as a primary management entity for the first devices of the first network and the second devices of the second network;
instructions to receive second device operating policies and second device attributes of the second devices of the second network when the negotiation determines that the second management entity will not operate as the primary management entity;
instructions to provide an adjusted second device operating policy for at least one of the second devices to the second management entity when the second device operating policy of the at least one of the second devices will cause interference with at least one of the first devices, the adjusted second device operating policy being based at least on the second device attributes of the at least one of the second devices;
instructions to determine whether a high quality data criterion of the requested service has been satisfied, wherein the high quality data criterion depends on at least one of the second devices of the second network; and
instructions to provide the high quality data indication to the one of the first devices when the high quality data criterion is satisfied.

20. The method of claim 1, wherein the interference comprises wireless transmission interference.

* * * * *